(12) United States Patent
Ishikawa

(10) Patent No.: US 6,271,985 B1
(45) Date of Patent: *Aug. 7, 2001

(54) FLANGED COVER FOR A LOW PROFILE MAGNETIC DISK APPARATUS

(75) Inventor: Masato Ishikawa, Higashine (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,023

(22) Filed: Aug. 6, 1998

(51) Int. Cl.⁷ .................................................. G11B 17/02
(52) U.S. Cl. ........................................................ 360/97.01
(58) Field of Search .............................. 360/97.01, 97.02

(56) References Cited

U.S. PATENT DOCUMENTS

| | | | |
|---|---|---|---|
| 5,233,491 | * 8/1993 | Kadonaga et al. | 360/97.02 |
| 5,349,483 | * 9/1994 | Tsai | 360/97.01 |
| 5,420,733 | * 5/1995 | Knighton et al. | 360/97.01 |
| 5,654,848 | * 8/1997 | Maiers t al. | 360/98.01 |
| 5,696,648 | * 12/1997 | Jeong et al. | 360/97.02 |
| 5,881,454 | * 3/1999 | Baxter et al. | 360/97.01 X |
| 5,936,798 | * 8/1999 | Johnson et al. | 360/97.01 |
| 6,023,973 | * 2/2000 | Mizoshita et al. | 360/98.08 |
| 6,172,842 | * 1/2001 | Satoh et al. | 360/97.01 |

* cited by examiner

*Primary Examiner*—Brian E. Miller
(74) *Attorney, Agent, or Firm*—Greer, Burns & Crain, LT

(57) ABSTRACT

A magnetic disk device includes a base and a cover to enclose magnetic disks and magnetic heads therein. The cover has side flange portions extending downward from a top cover portion and an end flange portion extending downward from the top cover portion. The height of the end flange portion is greater than the height of the side flange portions. A bar code label can be attached to the end flange portion.

8 Claims, 5 Drawing Sheets

FLANGED COVER FOR A LOW PROFILE MAGNETIC DISK APPARATUS

BACKGROUND OF THE INVENTION

1. Field of the Invention

The present invention relates to a magnetic disk device having a disk and a head enclosed therein.

2. Description of the Related Art

A magnetic disk device has magnetic disks and magnetic heads enclosed therein for reading data stored in the magnetic disks and for writing data in the magnetic disks. The magnetic disk device includes a base in which magnetic disks and magnetic heads are arranged and a cover attached to the base to enclose the magnetic disks and the magnetic heads in the base and the cover. Such a magnetic disk device is usually referred to as a disk enclosure.

A bar code label is attached to the magnetic disk device to indicate the production number and the job number of the magnetic disk device, to manage the magnetic disk device during the assembling process and the shipping test process. The bar code label has a bar code printed thereon, which can be read by a bar code reader. In the shipping test process, for example, a test apparatus having testing slots is used so that the magnetic disk devices are inserted in the testing slots. The magnetic disk device has a connector on one end thereof which is first inserted in the testing slot to engage with a corresponding connector in the testing slot. The opposite end of the magnetic disk device can be seen from outside the test apparatus. The bar code label is attached to the outside end surface of the magnetic disk device so that the bar code can be easily and efficiently read by the bar code reader, with the magnetic disk device in the testing slot of the test apparatus.

The cover has a top cover portion and a flange portion depending from the top cover portion, the flange portion being fitted on the upper portion of the base. The remaining lower portion of the base is exposed. Therefore, the end surface of the magnetic disk device, to which the bar code label is attached, is formed by the end flange portion of the cover and the exposed lower portion of the base. The bar code label must be attached to either the end flange portion of the cover or the exposed lower portion of the base.

The bar code must have a certain height (or a vertical length) so that the bar code can be reliably read, since the bar code cannot be exactly read if the height of the bar code is too small. Accordingly, the bar code label must have a certain height (or a vertical length), which is typically 5 to 6 millimeters. In conventional 2.5 inch magnetic disk devices, the height of the entire device is greater than 12.5 millimeters, and the height of the end surface of the exposed lower portion of the base is greater than 7 millimeters, but the height of the end flange portion of the cover is 2 to 3 millimeters. Therefore, it is possible to attach the bar code label to the end surface of the exposed lower portion of the base.

Recently, the sizes of 2.5 inch magnetic disk devices has been reduced, and magnetic disk devices having the height of 9.5 millimeters are beginning to appear in the market. In this case, the height of the end surface of the exposed lower portion of the base is only 4 millimeters, and it is difficult to attach the bar code label to the end surface of the exposed lower portion of the base.

SUMMARY OF THE INVENTION

The object of the present invention is to provide a disk device having an end surface to which a bar code label can be attached.

According to the present invention, there is provided a disk device comprising a base having a disk and a head arranged therein, and a cover attached to the base to enclose the disk and the head in the base and the cover. The cover has a top cover portion having a top surface, a first flange portion, extending downward from the top cover portion, with a first height from the top surface and a second flange portion, extending downward from the top cover portion, with a second height from the top surface, the second height being greater than the first height.

In a preferred embodiment, a magnetic disk device comprises a base having a disk and a head arranged therein, and a cover attached to the base to enclose the disk and the head in the base and the cover. The cover has a top cover portion having a top surface, at least one side flange portion, extending downward from the top cover portion, with a first height from the top surface and at least one end flange portion, extending downward from the top cover portion with a second height from the top surface, the second height being greater than the first height.

Preferably, the disk device further comprises a label attached to the at least one end flange portion.

Preferably, the label bears a bar code.

Preferably, the at least one side flange portion comprises two side flange portions arranged opposite to each other, and the at least one end flange portion comprises one end flange portion.

Preferably, the disk device further comprises a further end flange portion arranged opposite to the one end flange portion, and a connector arranged below the further end flange portion.

Preferably, the disk device comprises a 2.5 inch disk device.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
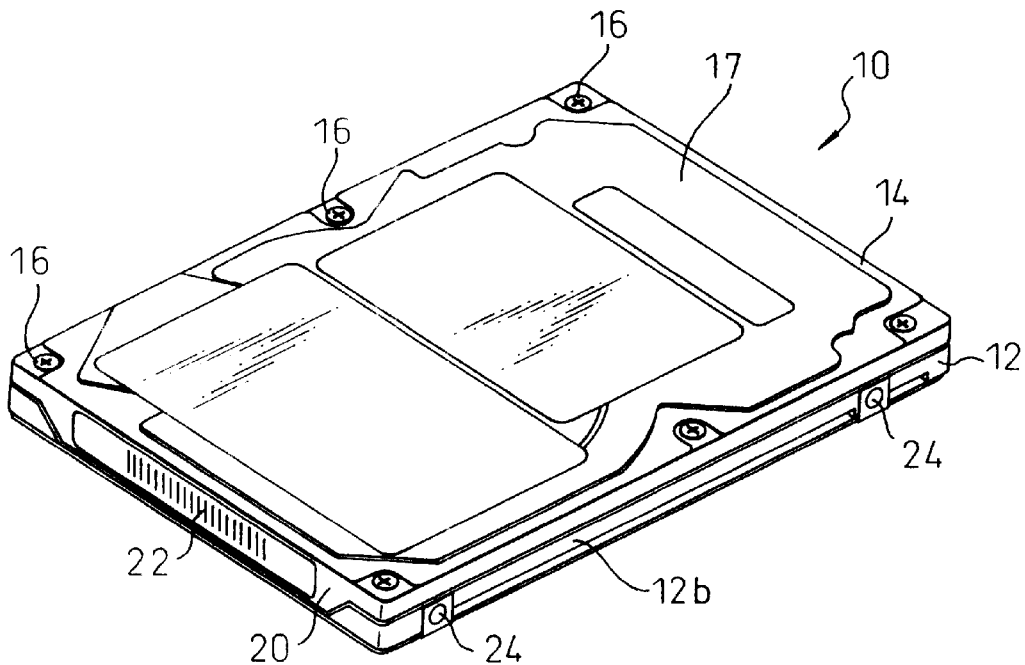
FIG. 1 is a perspective view of a magnetic disk device according to the embodiment of the present invention.
Figure 2:
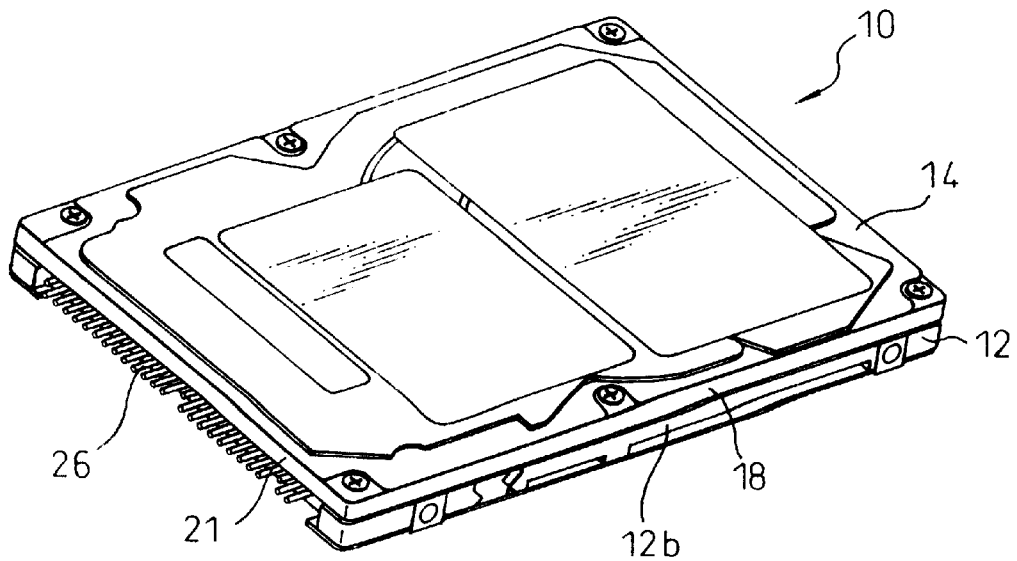
FIG. 2 is a perspective view of the magnetic disk device of FIG. 1, viewed from the arrow II in FIG. 1.

Referring to FIGS. 1 to 4, the 2.5 inch magnetic disk device 10 according to the embodiment of the present invention includes a base 12 and a cover 14 attached to the base 12. The cover 14 is fixed to the base by screws 16. The base 12 has threaded holes 24 to receive screws to mount the magnetic disk device 10 to an apparatus of a computer system.

The cover 14 has a top cover portion 17 and a flange portion extending downward from the outer periphery of the top cover portion 17. The flange portion includes opposite side flange potions 18 and opposite end flange portions 20 and 21, and is fitted on the upper portion 12a of the peripheral wall of the base 12. The lower portion 28 of the peripheral wall of the base 12 is exposed from the flange portion.

Figure 3:
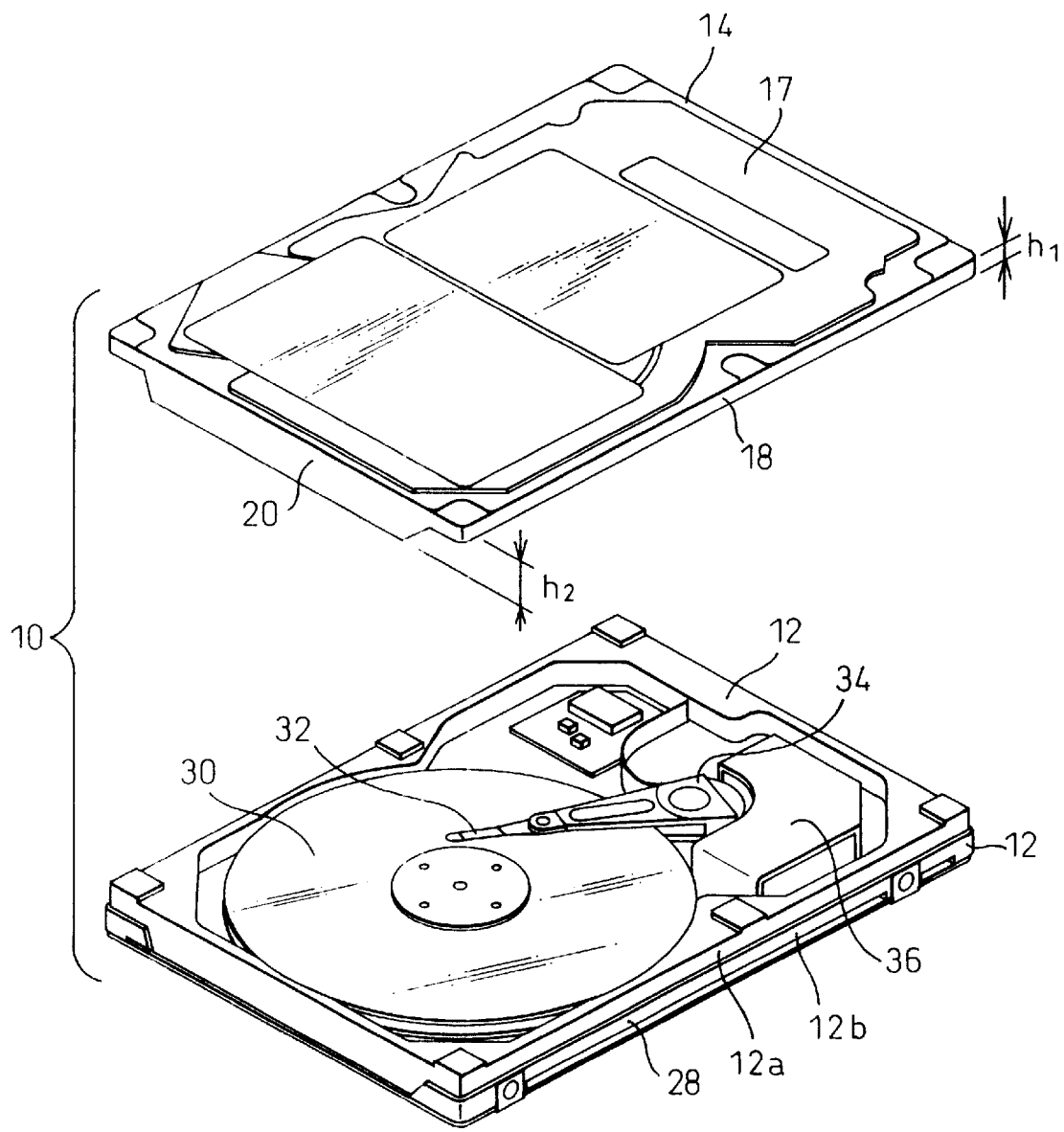
FIG. 3 is an exploded perspective view of the magnetic disk device of FIG. 1.
Figure 4:
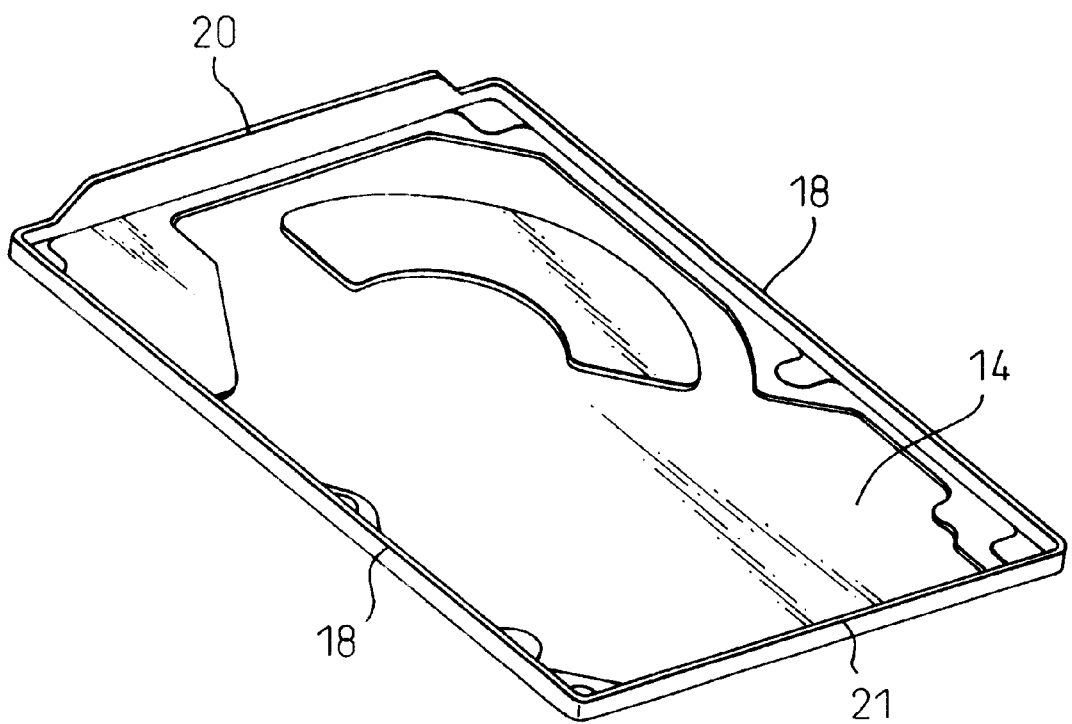
FIG. 4 is a bottom perspective view of the cover of the magnetic disk device of FIGS. 1 to 3.

The side flange portions 18 have a first height $h_1$ measured from the top surface of the top cover portion 17, and the end flange portion (hereinafter referred to a rear end flange portion) 20, which is seen in FIGS. 1 and 3, has a second height $h_2$ measured from the top surface of the top cover portion 17. The second height $h_2$ is greater than the first height $h_1$. The height of the other end flange portion 21 (hereinafter referred to a front end flange portion) is identical to the first height $h_1$ (see FIG. 4).

Typically, the height of the entire device is 9.5 millimeters. The first height $h_1$ of the side flange portions 18 is 2 to 3 millimeters. The second height $h_2$ of the rear end flange portion 20 is extended to 7 millimeters.

A bar code label 22 having a bar code printed thereon is adhered to the surface of the rear end flange portion 20 which provides for a sufficient surface area to position the bar code label 22 thereon. A connector 26 is arranged below the front end flange portion 21.

The base 12 has magnetic disks 30 and magnetic heads 32 arranged therein, as shown in FIG. 3. The magnetic heads 32 are supported by arms of an actuator arm assembly 34, and a driving circuit 36 is also arranged in the base 12. The magnetic disks 30 and the magnetic heads 32 are well known in the art, and a detailed description thereof is omitted here.

Figure 5:
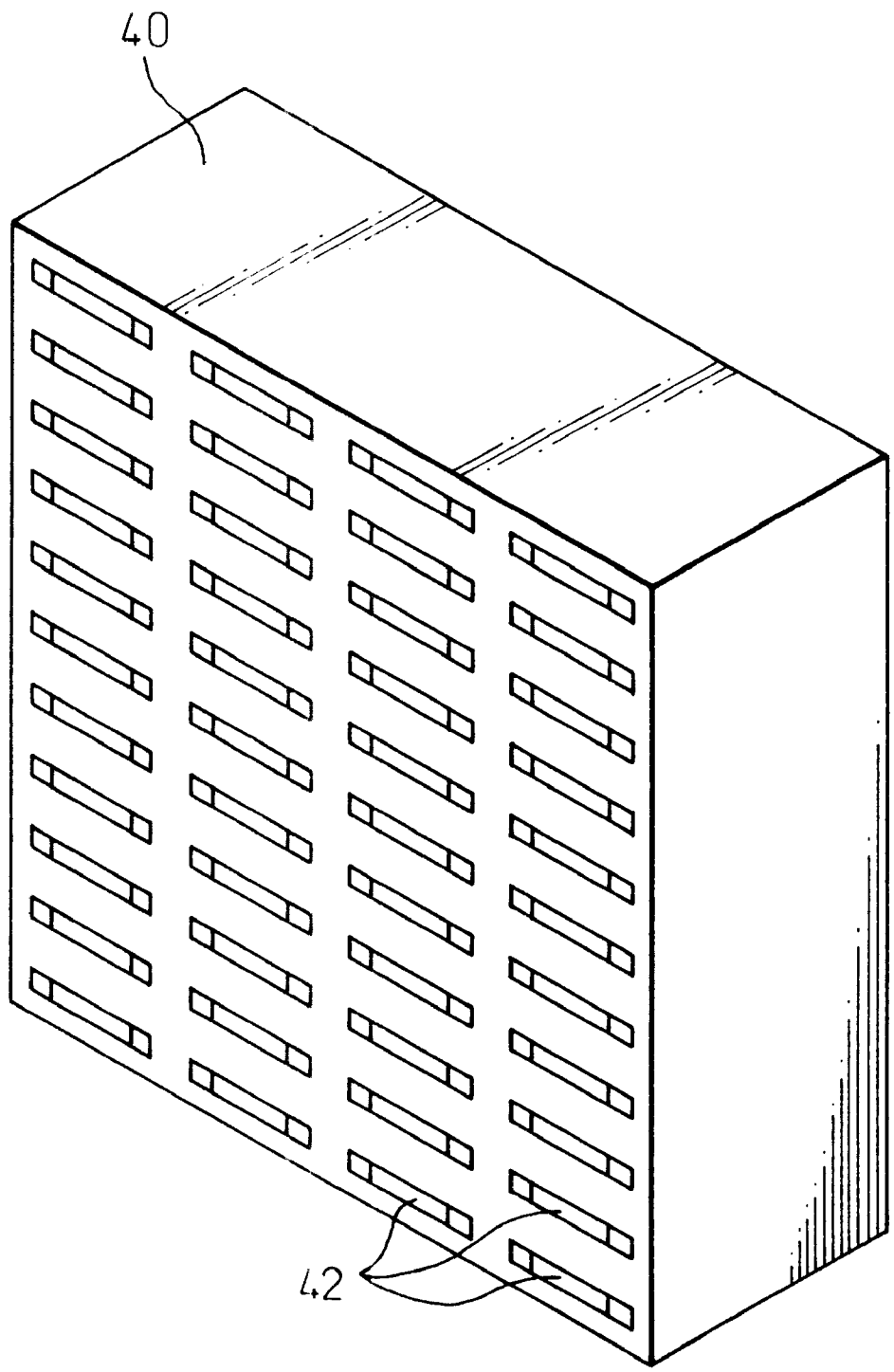
FIG. 5 is a perspective view of a testing apparatus.
Figure 6:
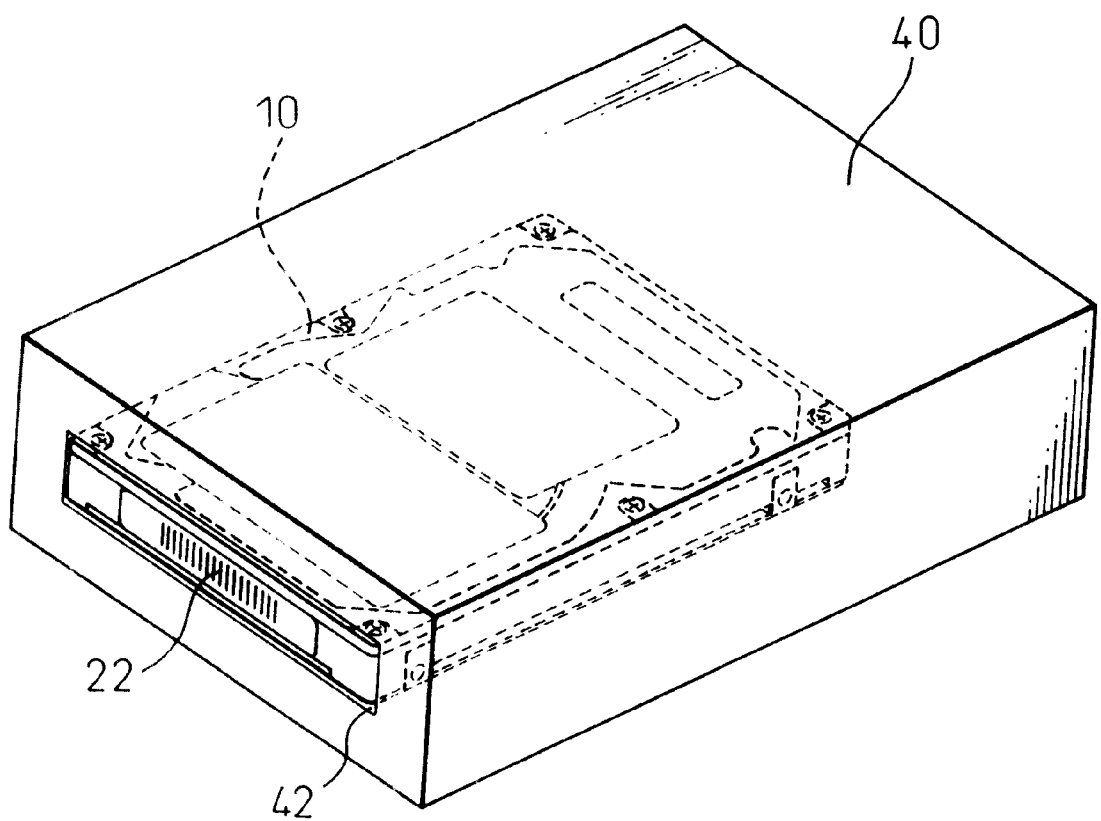
FIG. 6 is a perspective view of a portion of the testing apparatus of FIG. 5, shown in an enlarged scale.

FIGS. 5 and 6 show a testing apparatus 40. The testing apparatus 40 has a plurality of testing slots 42. In the test of the magnetic disk device 10, the magnetic disk device 10 is inserted in one testing slot 42, so that the connector 26 is first inserted and the bar code label 22 is exposed to the exterior of the testing apparatus 40. Therefore, the bar code on the bar code label 22 can be easily and reliably read by a bar code reader (not shown).

As described above, the cover 14 has flange portions having different heights from each other, so a bar code label can be attached to the extended flange cover portion of the cover even if the height of the entire device is reduced.

What is claimed is:

1. A disk device comprising:

a base having a disk and a head arranged therein, said base having a bottom surface and an outer peripheral wall, said outer peripheral wall having a first portion with an outer surface, and a second portion with a stepped outer surface, said stepped outer surface including a first surface and a second surface, with a step between said first and second surfaces, wherein said first surface is located near said bottom surface and outwardly projects from said first portion;

a cover attached to the base to enclose the disk and the head within the base and the cover;

said cover having a top cover portion having a top surface, a first flange portion extending from said top cover portion with a first height from said top surface, and a second flange portion extending from said top cover portion with a second height from said top surface that is less than said first height; and said first flange portion being fitted on said outer surface of said first portion of said outer peripheral wall of said base and extending generally flush with said bottom surface, said second flange portion being fitted on said second surface of said second portion.

2. The disk device according to claim 1, further comprising a label attached to said first flange portion.

3. A disk device according to claim 2, wherein said label bears a bar code.

4. The disk device according to claim 1, wherein said second flange portion commences at said step and extends to include a pair of opposite side flange portions and an opposite end flange portion.

5. The disk drive according to claim 4, wherein a connector is positioned below said opposite end flange portion.

6. The disk device according to claim 1, wherein said disk device is a 2.5 inch disk device.

7. A disk device according to claim 1 wherein at least one of said first flange said second flange is configured to receive a bar code label.

8. A disk device according to claim 7 wherein a height of at least one of said first flange and said second flange, measured from said top cover portion to said base is greater than 2 mm and less than or equal 7 mm.

* * * * *

UNITED STATES PATENT AND TRADEMARK OFFICE
CERTIFICATE OF CORRECTION

PATENT NO. : 6,271,985 B1
DATED : August 7, 2001
INVENTOR(S) : Masato Ishikawa

It is certified that error appears in the above-identified patent and that said Letters Patent is hereby corrected as shown below:

<u>Title page,</u>
Item [56], References Cited, please delete "6,023,973" and insert -- 6,025,973 -- therefor.

Signed and Sealed this

Second Day of April, 2002

*Attest:*

JAMES E. ROGAN
*Attesting Officer*   *Director of the United States Patent and Trademark Office*